US010267141B2

(12) United States Patent
Nunes et al.

(10) Patent No.: US 10,267,141 B2
(45) Date of Patent: Apr. 23, 2019

(54) DISTRIBUTED SENSING SYSTEMS AND METHODS WITH EFFICIENT ENERGY SPECTRUM ANALYSIS

(71) Applicant: HALLIBURTON ENERGY SERVICES, INC., Houston, TX (US)

(72) Inventors: Leonardo de Oliveira Nunes, Houston, TX (US); Christopher Lee Stokely, Houston, TX (US); David Andrew Barfoot, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 159 days.

(21) Appl. No.: 15/323,079

(22) PCT Filed: Jul. 18, 2014

(86) PCT No.: PCT/US2014/047141
§ 371 (c)(1),
(2) Date: Dec. 29, 2016

(87) PCT Pub. No.: WO2016/010550
PCT Pub. Date: Jan. 21, 2016

(65) Prior Publication Data
US 2017/0130574 A1 May 11, 2017

(51) Int. Cl.
*E21B 47/00* (2012.01)
*G01V 1/22* (2006.01)
(Continued)

(52) U.S. Cl.
CPC ........ *E21B 47/0002* (2013.01); *E21B 47/123* (2013.01); *G01H 9/004* (2013.01); *G01V 1/226* (2013.01)

(58) Field of Classification Search
CPC ... E21B 47/0002; E21B 47/123; G01H 9/004; G01V 1/226; G01V 8/00; G01D 5/3537
See application file for complete search history.

(56) References Cited

U.S. PATENT DOCUMENTS

2006/0066839 A1 3/2006 Payton
2007/0171402 A1 7/2007 Watley et al.
(Continued)

FOREIGN PATENT DOCUMENTS

JP 09-089714 4/1997

OTHER PUBLICATIONS

Lim, Y.C., et al., "Fast Filter Bank (FFB)," IEEE Transactions on Circuits and Systems-II: Analog and Digital Signal Processing, vol. 39, No. 5, May 5, 1992, pp. 316-318.
(Continued)

*Primary Examiner* — Yong-Suk Ro
(74) *Attorney, Agent, or Firm* — Gilliam IP PLLC

(57) ABSTRACT

A system includes an optical fiber and an interrogator to provide source light to the optical fiber. The system also includes a receiver coupled to the optical fiber. The receiver includes at least one fiber optic coupler that receives backscattered light and that produces one or more optical interferometry signals from the backscattered light. The receiver also includes photo-detectors that produce an electrical signal for each of the one or more optical interferometry signals. The system also includes at least one digitizer that digitizes each electrical signal. The system also includes at least one processing unit that processes each digitized electrical signal to obtain a distributed sensing signal and related energy spectrum information. The energy spectrum information corresponds to energy calculated for each of a limited number of frequency subbands by segmenting the distributed sensing signal into blocks having a predetermined block length and by applying a filter having a filter length that is smaller than the predetermined block length.

25 Claims, 9 Drawing Sheets

(51) Int. Cl.
*E21B 47/12* (2012.01)
*G01H 9/00* (2006.01)

(56) References Cited

U.S. PATENT DOCUMENTS

2010/0107754 A1   5/2010   Hartog et al.
2012/0237205 A1   9/2012   Duncan et al.

OTHER PUBLICATIONS

Lim, Yong Ching, et al., "Analysis and Optimum Design of the FFB," IEEE International Conference on Circuits and Systems, 1994, London, UK, 2, pp. 509-512.

PCT International Search Report and Written Opinion, dated Apr. 17, 2015, Appl No. PCT/US2014/047141, "Distributed Sensing Systems and Methods With Efficient Energy Spectrum Analysis," Filed Jul. 18, 2014.

CA Application Serial No. 2,953,938, First Examiner's Letter, dated Feb. 27, 2018, 4 pages.

DISTRIBUTED SENSING SYSTEMS AND METHODS WITH EFFICIENT ENERGY SPECTRUM ANALYSIS

BACKGROUND

Fiber optic sensing systems may be used to monitor downhole parameters such as vibrations, acoustics, pressure, and temperature changes. One example sensing system technology is referred to as distributed acoustic sensing (DAS). In a DAS system, an interrogation beam is conveyed along an optical fiber, and interferometric techniques are applied to perform phase analysis of backscattered light. The phase information of backscattered light can be correlated with acoustic activity at points along the optical fiber. Energy spectrum analysis of the phase information would provide additional information related to the intensity of acoustic activity for different frequency ranges. However, due to the immense amount of information collected during distributed sensing, real-time energy spectrum analysis is computationally difficult.

BRIEF DESCRIPTION OF THE DRAWINGS

Accordingly, there are disclosed herein distributed sensing systems and methods with efficient energy spectrum analysis. In the drawings.

Figure 1A:
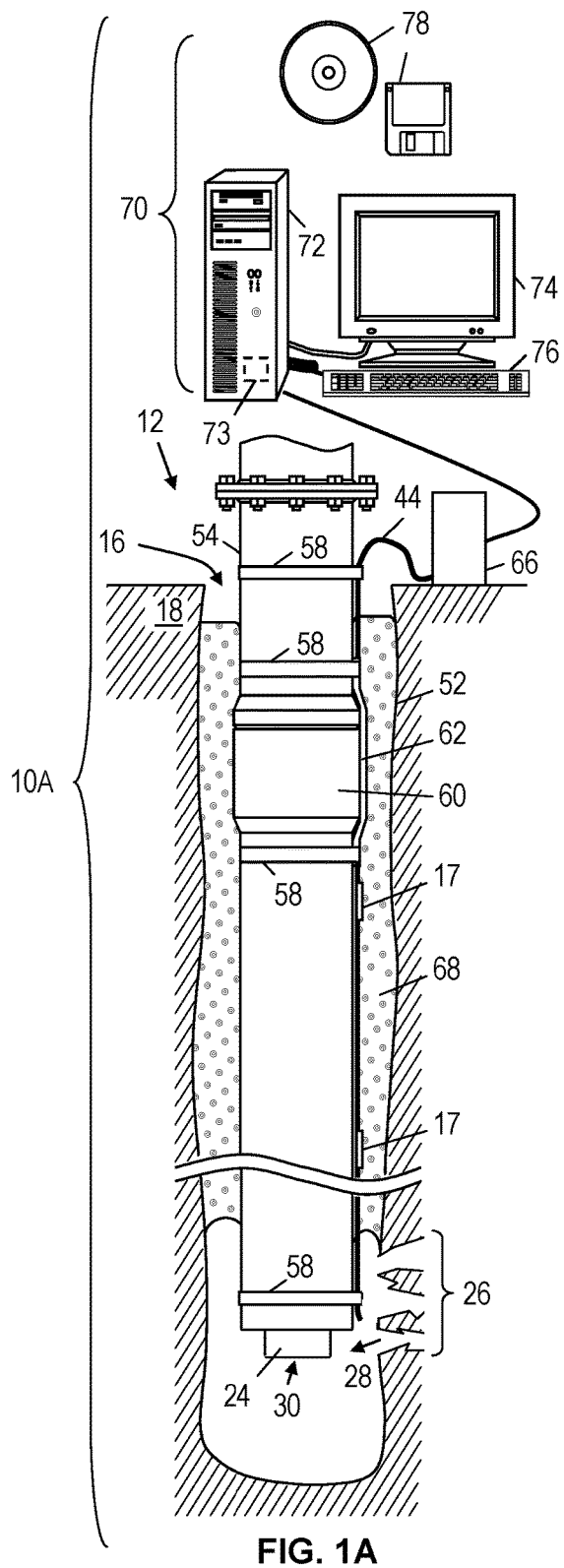
FIGS. 1A-1C are schematic diagrams of optical distributed sensing well environments.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The problems outlined above are at least in part addressed by an energy spectrum analysis methodology that computes signal energy efficiently for a given time and frequency region. While other applications are possible, the disclosed energy spectrum analysis methodology was developed for use with distributed acoustic sensing (DAS) systems. The low computational complexity of the disclosed energy spectrum analysis methodology makes its use in real-time feasible and supports various energy spectrum analysis options. As an example, energy spectrum analysis related to DAS or other distributed sensing may be used for turbulent flow monitoring, plug leak detection, flow-regime determination, wellbore integrity monitoring, event detection, data visualization, and decision-making.

In at least some embodiments, a distributed sensing system includes an optical fiber and an interrogator to provide source light to the optical fiber. The distributed sensing system also includes a receiver coupled to the optical fiber. The receiver includes at least one fiber optic coupler that receives backscattered light and that produces optical interferometry signals from the backscattered light. The receiver also includes photo-detectors that produce an electrical signal for each of said optical interferometry signals. The distributed sensing system also includes at least one digitizer that digitizes the electrical signals. Further, the distributed sensing system includes at least one processing unit that processes the digitized electrical signals to obtain a distributed sensing signal and related energy spectrum information, wherein the energy spectrum information corresponds to energy calculated for each of a limited number of frequency subbands is obtained by segmenting the distributed sensing signal into blocks having a predetermined block length and by applying a filter having a filter length that is smaller than the predetermined block length.

Figure 1B:
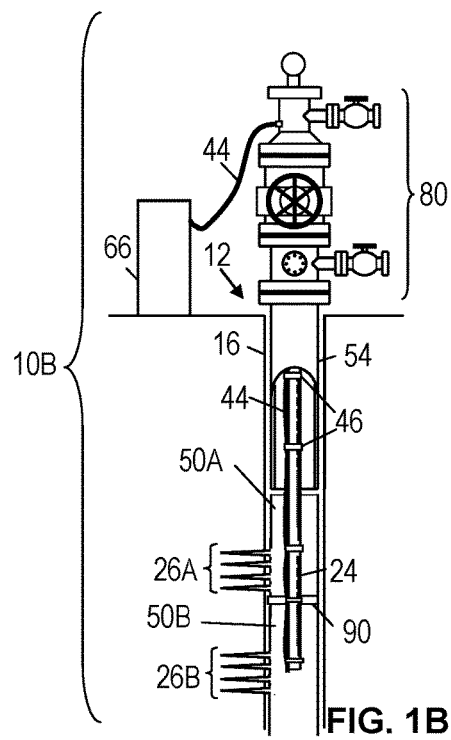
Figure 1C:
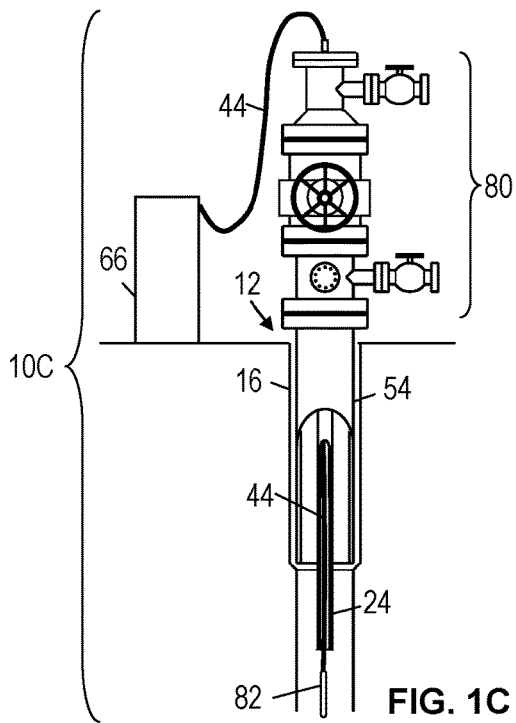

The disclosed techniques are best understood in an application context. Turning now to the figures, FIGS. 1A-1C show illustrative optical distributed sensing well environments 10A-10C. In well environment 10A, a drilling rig has been used to drill and complete well 12 in a typical manner, with a casing string 54 positioned in the borehole 16 that penetrates into the earth 18. The casing string 54 includes multiple tubular casing sections (usually about 30 feet long) connected end-to-end by couplings 60. (FIG. 1 is not to scale). Typically the casing string includes many such couplings.) Within the well 12, a cement slurry 68 has been injected into the annular space between the outer surface of the casing string 54 and the inner surface of the borehole 16 and allowed to set. A production tubing string 24 has been positioned in an inner bore of the casing string 54.

The well 12 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole and thence to the surface via an opening 30 at the bottom of the production tubing string 24. Note that this well configuration is illustrative and not limiting on the scope of the disclosure. For example, fluid flow to or from a formation is possible at other points along the well 12 (not only at the bottom). Further, the well 12 may correspond to a production well or injection well. Alternatively, optical distributed sensing as described herein may be deployed in a monitoring well.

The optical distributed sensing well environment 10A includes an interface 66 coupled to a fiber optic cable 44 for distributed downhole sensing. The interface 66 is located on the surface of the earth 18 near the wellhead, i.e., a "surface interface". In the embodiment of FIG. 1A, the fiber optic cable 44 extends along an outer surface of the casing string 54 and is held against the outer surface of the casing string 54 at spaced apart locations by multiple bands 58 that extend around the casing string 54. A protective covering 62 may be installed over the fiber optic cable 44 at each of the couplings 60 of the casing string 54 to prevent the fiber optic cable 44 from being pinched or sheared by the coupling's contact with the borehole wall. The protective covering 62 may be held in place, for example, by two of the bands 58 installed on either side of coupling 60.

In at least some embodiments, the fiber optic cable 44 terminates at surface interface 66 with an optical port adapted for coupling the fiber(s) in cable 44 to a light source and a detector. The light source transmits light pulses along the fiber optic cable 44, which contains a fiber with scattering impurities. As each pulse of light propagates along the fiber, some of the pulse is scattered back along the fiber from every point on the fiber. Thus the entire fiber acts as a distributed sensor. The optical port of the surface interface 66 communicates backscattered light to the detector, which responsively produces interferometry measurements from backscattered light attributes (e.g., phase or phase shift) corresponding to different points along the fiber optic cable 44. From the recovered phase information, the value of a downhole parameter sensed by the fiber at the location of the backscatter can be determined. Further, energy spectrum analysis of the recovered phase information may be performed as described herein.

As shown, the optical distributed sensing well environment 10A also includes a computer 70 coupled to the surface interface 66 to control the light source and detector. The illustrated computer 70 includes a chassis 72 with at least one processing unit 73. Further the computer 70 includes an output device 74 (e.g., a monitor as shown in FIG. 1A, or a printer), an input device 76 (e.g., a keyboard), and non-transient information storage media 78 (e.g., magnetic or optical data storage disks). It should be appreciated that the computer 70 may be implemented in different forms including, for example, an embedded computer permanently installed as part of the surface interface 66, a portable computer that is plugged into or wirelessly linked to the surface interface 66 as desired to collect data, and a remote desktop computer coupled to the surface interface 66 via a wireless link and/or a wired computer network. In at least some embodiments, the computer 70 is adapted to receive digitized interferometry signals from the surface interface 66 and to responsively determine a distributed sensing signal and related energy spectrum information as a function of position along the length of the fiber optic cable 44 and time. The distributed sensing signal may correspond to a phase or phase variance as a function of time that corresponds to a distributed sensing parameter such as temperature, acoustic energy, vibrational energy (including active or passive seismic), pressure, strain, deformation, chemical concentrations, nuclear radiation intensity, electromagnetic energy, and/or acceleration. Further, the computer 70 may perform energy spectrum analysis of a distributed sensing signal as described herein.

In at least some implementations, the non-transient information storage media 78 stores a software program for execution by computer 70. The instructions of the software program cause the computer 70 to recover phase information from digitized interferometry signals received from surface interface 66 and to perform energy spectrum analysis as described herein. With the recovered phase information and related energy spectrum analysis information, distributed sensing parameter values and their energy as a function of different points along the fiber optic cable 44 (e.g., every 2 meters) and time can be determined. Further, instructions of the software program may also cause the computer 70 to display information associated with distributed sensing parameter values and energy spectrum analysis results via the output device 74.

FIG. 1B shows an alternative optical distributed sensing well environment 10B, where the fiber optic cable 44 is strapped to the outside of the production tubing 24 rather than the outside of casing 54. Rather than exiting the well 12 from the annular space outside the casing 54, the fiber optic cable 44 exits through an appropriate port in "Christmas tree" 80 (i.e., the assembly of pipes, valves, spools, and fittings connected to the top of the well 12 to direct and control the flow of fluids to and from the well 12) and couples to surface interface 66, which may include optical interrogation and receiver components to perform interferometry analysis of backscattered light along fiber optic cable 44 as described herein. Further, a computer (e.g., computer 70) may receive digitized interferometry signals from surface interface 66, and may recover phase information and energy spectrum analysis information as described herein. The phase information, distributed sensing parameter values, and/or energy spectrum analysis results may stored or displayed. Further, logs and images derived from distributed sensing parameter values and/or energy spectrum analysis results may be stored or displayed.

In the optical distributed sensing well environment 10B, the fiber optic cable 44 extends along the outer surface of the production tubing string 24 and is held against the outer surface of the production tubing string 24 at spaced apart locations by multiple bands 46 that extend around the production tubing string 24. In some embodiments, a portion of the fiber optic cable 44 (a hanging tail) extends past the production tubing string 24. In the optical distributed sensing well environment 10B, two perforations 26A and 26B have been created in borehole 16 to facilitate obtaining formation fluids from two different zones 50A and 50B defined by a packer 90 that seals an annulus around the production tubing string 24. More specifically, formation fluid enters zone 50A and production tubing string 24 via the perforation 26A, while formation fluid enters zone 50B and production tubing string 24 via the perforation 26B. As shown, the fiber optic cable 44 extends through the different zones 50A and 50B to enable distributed sensing operations along well 12 including zones 50A and 50B. Although only two zones 50A and 50B are shown for optical distributed sensing well environment 10B, it should be appreciated that additional zones may be defined along well 12.

FIG. 1C shows an alternative optical distributed sensing well environment 10C, where the fiber optic cable 44 is suspended inside production tubing 24. A weight 82 or other conveyance mechanism is employed to deploy and possibly anchor the fiber optic cable 44 within the production tubing 24 to minimize risks of tangling and movement of the fiber optic cable 44 from its desired location. The fiber optic cable 44 exits the well 12 via an appropriate port in Christmas tree 80 and attaches to the surface interface 66. Again, surface interface 66 and a computer (e.g., computer 70) enables interferometry analysis of backscattered light along fiber optic cable 44, recovery of phase information, energy spectrum analysis as described herein.

Other alternative optical distributed sensing well environments employ composite tubing with one or more optical fibers embedded in the wall of the tubing. The composite tubing can be employed as the casing and/or the production string. Alternatively, a fiber optic cable such as cable 44 could be arranged inside or outside of normal, metallic coiled tubing. Further, a fiber optic cable such as cable 44 and a weighted section of transmission line may be run on the end of standard electric cable.

Figure 2:
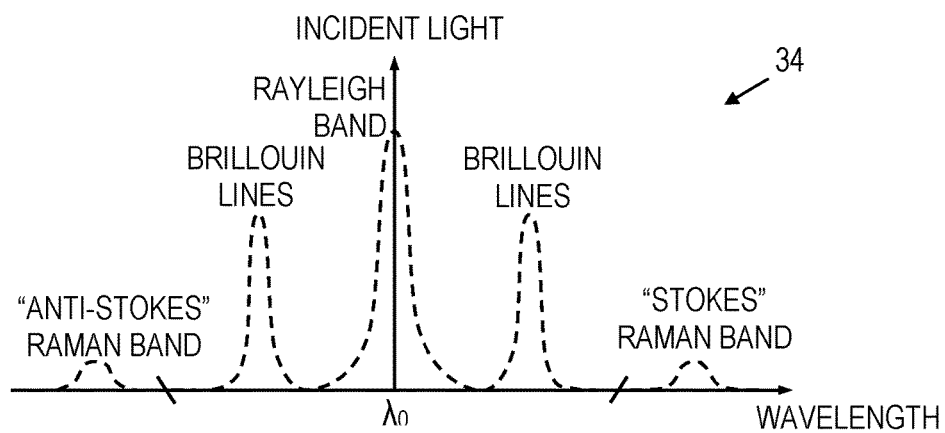
FIG. 2 is a graph showing optical intensity versus wavelength for various forms of optical backscattering.

FIG. 2 shows a graph 34 illustrating optical intensity versus wavelength for various forms of optical backscattering. At the center of the abscissa is the wavelength $\lambda_0$ of the light initially launched into the waveguide. Rayleigh backscattering has the highest intensity and is centered at the wavelength $\lambda_0$. Rayleigh backscattering is due to microscopic inhomogeneities of refractive index in the waveguide material matrix. Note that Raman backscattering (which is due to thermal excited molecular vibration known as optical phonons) has an intensity which varies with temperature T, whereas Brillouin backscattering (which is due to thermal excited acoustic waves known as acoustic phonons) has a wavelength which varies with both temperature T and strain ε. Detection of Raman backscattering is typically used in DTS systems, due in large part to its direct relationship between temperature T and intensity, and almost negligent sensitivity to strain ε.

However, the Raman backscattering intensity is generally significantly less than that of Rayleigh or Brillouin backscattering, giving it a correspondingly lower signal-to-noise ratio. Consequently, it is common practice to sample the Raman backscattering many times and digitally average the readings, which results in an effective sample rate of from tens of seconds to several minutes, depending on the desired signal-to-noise ratio, fiber length and desired accuracy.

Figure 3:
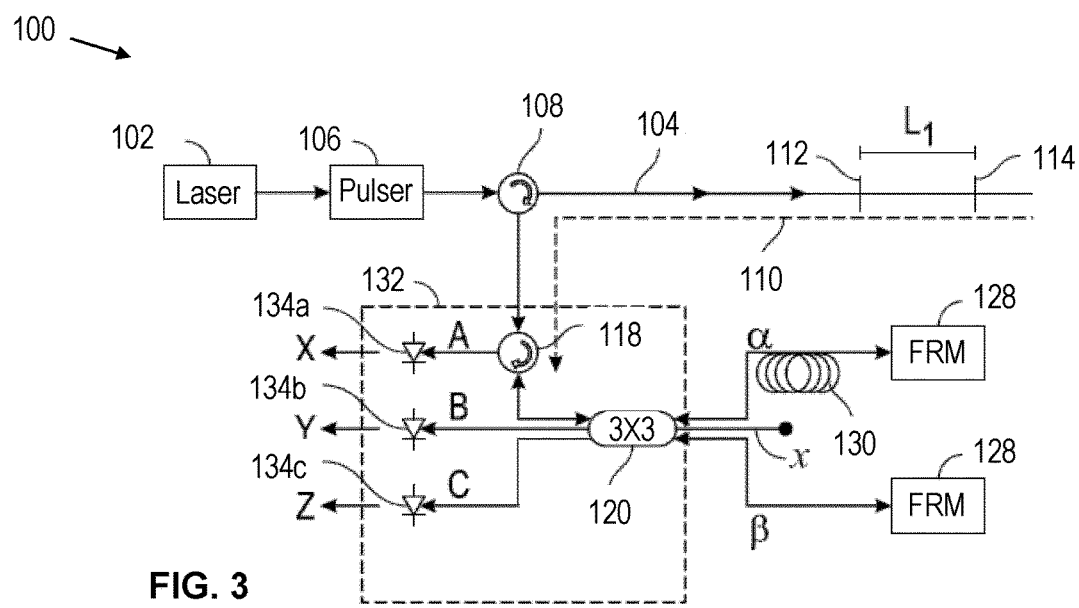
FIG. 3 is a schematic diagram of an optical phase interferometric sensing arrangement.

FIG. 3 depicts one illustrative arrangement 100 for optical phase interferometric sensing. The arrangement 100 includes a laser 102, or other light source, that generates an interrogation signal on a distributed sensing fiber 104. The laser 102 may provide a pulsed or non-pulsed interrogation signal. If a non-pulsed interrogation signal is output from the laser 102, a pulser 106 may be employed to pulse the interrogation signal. The interrogation signal may then interact with a first circulator 108 which couples the pulsed interrogation signal to the distributed sensing fiber 104.

As each interrogation signal pulse travels through the distributed sensing fiber 104, a portion of the pulse energy is reflected due to reflective elements or imperfections along the distributed sensing fiber 104. For illustrative purposes, the reflected signal is depicted in FIG. 3 as return signal 110. In some embodiments, the return signal 110 may be generated from discrete reflective elements placed along the distributed sensing fiber 104, such as fiber Bragg gratings (FBGs) arranged at positions 112 and 114.

Alternatively, when performing distributed acoustic sensing (DAS), the return signal 110 may be generated from inherent reflection within the distributed sensing fiber 104 due to fiber imperfections (e.g., impurities). When such scattering occurs elastically, it may correspond to Rayleigh backscatter. In FIG. 3, the backscatter is depicted as occurring at the positions 112 and 114 along the distributed sensing fiber 104. However, those of skill in the art will recognize that there may be numerous other reflection points along the distributed sensing fiber 104.

The first circulator 108 additionally couples the return signal 110 to a receiver 132. In at least some embodiments, the receiver 132 includes a second circulator 118 which conveys the return signal 110 a 3×3 fiber optic coupler 120. The fiber optic coupler 120 distributes the return signal 110 across three paths labeled α, β, x. The x path is terminated with an absorber and is not used further. The α and β paths are each terminated with a Faraday rotator mirror (FRM) 128 that reflects the signals to the fiber optic coupler 120, albeit with a polarization reversal that compensates for any polarization-shifts inadvertently introduced along the α and β paths. A delay coil 130 is included in the α path to introduce a delay in the reflected signal relative to the signal reflected along the β path. The fiber optic coupler 120 combines the signals from the α and β (and the unused x) paths to form three optical interferometry signals A, B, C. The delay introduced between the α and β paths corresponds to the distance or "sensing window" L1 between the reflection points 112, 114 on the distributed sensing fiber 104, enabling the phase change incurred over this length to be measured and monitored as an interferometric signal phase. Due to the nature of the fiber optic coupler 120, the optical interferometry signals A, B, C have mutual phase separations of 120°. For example, as the α and β signals enter the 3×3 coupler 120, the interferometric signal A exiting the fiber optic coupler 120 may be α+β∠0°, B may be α+(β∠+120°), and C may be α+(β∠−120°).

The optical phase interferometric sensing arrangement 100 also implements single-ended detectors 134a-134c, which receive the optical interferometry signals A, B, and C and output signals X, Y, and Z. Examples of single-ended detectors 134a-134c include p-intrinsic-n field-effect-transistors (PINFETs), where optical receivers and high gain transimpedance amplifiers are used. In at least some embodiments, the single-ended detectors 134a-134c correspond to square law detectors with a bandwidth much lower than the optical frequency (e.g., less than 1 GHz). In an exemplary operation, measurements such as dynamic strain, acoustics, and vibrations may be determined through analysis of the outputs of the single-ended detectors 134a-134c to determine the associated optical phase shift. For more information regarding optical phase demodulation using an optical phase interferometric sensing arrangement such as arrangement 100, reference may be had to International Application Number PCT/US14/19232, entitled "Interferometric High Fidelity Optical Phase Demodulation" and filed Feb. 28, 2014.

It should be appreciated that the disclosed energy spectrum analysis methodology may be used with other sensing arrangements. For example, U.S. Pat. No. 7,764,363 and U.S. Pat. Pub. No. 2012/0067118 describe other sensing arrangements for which the disclosed energy spectrum analysis methodology may be used. In general, the disclosed energy spectrum analysis methodology may be applied to any distributed sensing system or sensor-based system, where phase modulation and phase demodulation is used to track a physical parameter such as strain, acoustics, vibrations, etc.

Figure 4:
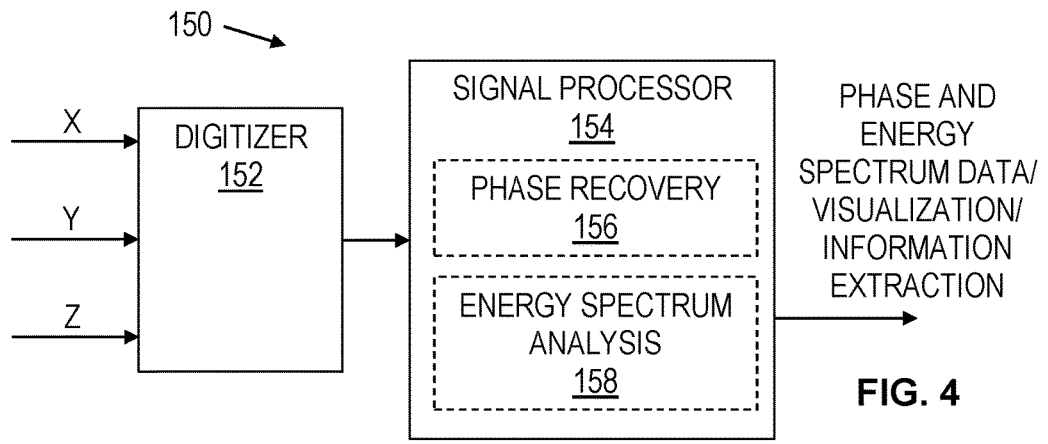
FIG. 4 is a block diagram of a signal processing arrangement.

FIG. 4 shows an illustrative signal processing arrangement 150 having a digitizer 152 that digitizes signals such as X, Y, Z, and signal processor 154 that receives the digitized signals from the digitizer 152. In accordance with at least some embodiments, the signal processor 154 comprises a phase recovery module 156 (e.g., to perform quadrature demodulation of phase) and an energy spectrum analysis module 158. For example, the signal processor 154 may correspond to one or more central processing unit (CPUs) or application-specific integrated circuits (ASICs) that execute software or firmware instructions corresponding to phase recovery module 156 and energy spectrum analysis module 158. The output of the signal processor 154 corresponds to phase data and energy spectrum analysis results that can be stored, visualized, correlated with distributed sensing parameters, and/or used for other information extraction.

In some embodiments, at least some of the components represented in arrangements 100 and 150 may be implemented with surface interface 66 and/or computer 70. As an example, the laser 102, pulser 106, and first circulator 108 may be part of an interrogator included with surface interface 66. Further, the receiver 132, and α and β paths may correspond to receiver or interferometry components included with surface interface 66. Further, the digitizer 152 may be included with surface interface 66. Meanwhile, the signal processor 154 may be part of surface interface 66 or computer 70.

Figure 5:
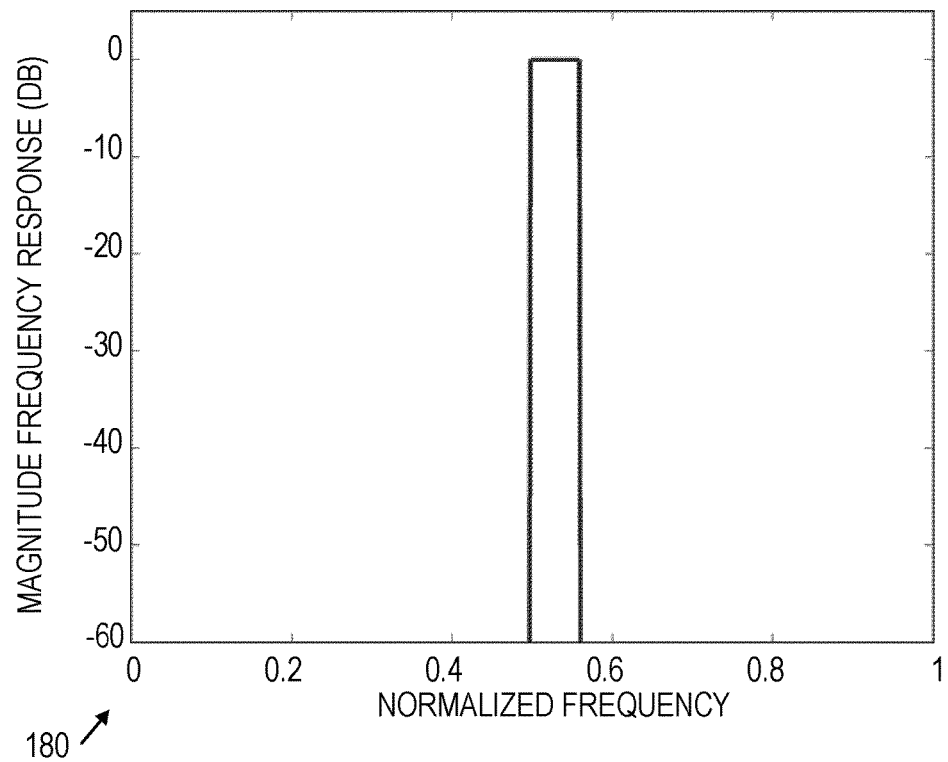
FIG. 5 is a graph showing an ideal magnitude frequency response for a filter.

Several techniques exist for energy spectrum analysis of joint time-frequency energy distributions. Usually, these techniques are interested in understanding abrupt signal variations as a function of frequency and/or time. In at least some embodiments, the disclosed energy spectrum analysis is used for analyzing relatively few different frequency regions. Moreover, the time-scale of the processes being monitored is of an order of magnitude larger than the periods associated with the frequencies of interest. Considering this, a solution would be to submit the signal to a filtering operation that preserves only certain frequency content of the signal. Such a filtering operation can be described as:

$$x_s[n]=(x*h_s)[n]=\Sigma_k x[k]h_s[n-k], \quad \text{Equation (1)}$$

where the s-th filter $h_s[n]$ is responsible for selecting a certain frequency region of the signal x[n], resulting in the new signal $x_s[n]$. An example of an ideal filter magnitude frequency response is shown in graph 180 of FIG. 5. Once the signals $x_s[n]$ are obtained for each desired frequency band s, the energy for each frequency band signal and each data block can be computed directly.

The main challenge of computing the power for different frequency bands using the equation above is related to the design of the filters $h_s[n]$. Sometimes the filter design is treated as a joint optimization problem, where each filter is related to each other and respects the same specifications. In the signal processing literature, such a set of filters are usually called filter banks and there exists a plethora of methods for designing them. Generally speaking, the filters of a filter bank have as little frequency overlap as possible as well as a very small time support. The small frequency overlap guarantees good frequency selectivity for each different frequency band, while the size of the time support is related to the time it takes for a change in the input signal to be reflected in the output signal. Also, the time support is related to the computational complexity of the filter. Thus, as the time support increases, more arithmetic operations are needed to compute a single output of the filter.

With equation 1, S convolutions needs to be performed before the power of the output of each different frequency band can be determined. Further, the operation represented in equation 1 needs the filtered version of the whole signal to be computed before its energy can be obtained. Thus, the implementation of equation 10 is not well-suited for real-time analysis.

In accordance with at least some embodiments, the disclosed energy spectrum analysis involves directly computing the power inside a data block and with reduced computational complexity. The proposed energy spectrum analysis methodology adapts an overlap-and-add (OLA) filtering scheme to calculate power for different frequency bands. Further, various modifications enable data to be shared among the filters for different frequency bands, reducing the number of operations that need to be performed by the method and enabling its real-time use.

OLA filtering operates by segmenting the filtering operation into several blocks, each with M non-overlapping samples of the input signal. Mathematically, the input signal x[n] is decomposed into blocks of length M as:

$$x[n] = \sum_{m=0}^{\infty} x_m[n - mM], \quad \text{Equation (2)}$$

where $$x_m[n] = \begin{cases} x[n+mM], & \text{for } 0 \le n < M \\ 0, & \text{otherwise} \end{cases}$$

is the signal at block m.

By segmenting the signal, it is possible to re-write the filtering operation as a function of partial convolutions performed for each segmented block as:

$$y[n]=\Sigma_{m=0}^{\infty} y_m[n-mM]=\Sigma_{m=0}^{\infty}(x_m*h_s)[n], \quad \text{Equation (3)}$$

It should be noted that since each $y_m[n]$ is the result of convolving the signal $x_m[n]$, which has length M samples, with the filter $h_s[n]$, whose length is assumed to be K, the output of each convolution has a length of L=M+K−1. Hence, the signals $y_m[n]$ will overlap in time, making a given output sample y[n] depend on the result of more than one block of data.

Figure 6:
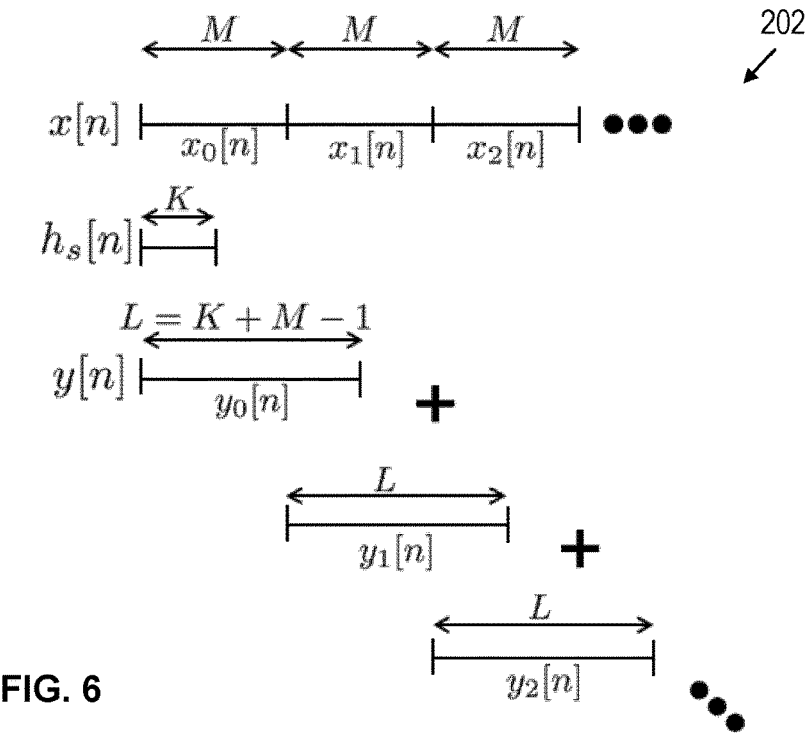
FIG. 6 is a chart showing an overlap-and-add process

If the input signal is zero-padded so that its length is L, the output of each block can be efficiently computed in the frequency domain as a multiplication. Using this scheme, the convolution of each block can be computed as:

$$y_m[n] = \frac{1}{\sqrt{L}} \sum_{k=0}^{L-1} X_m[k] H_S[k] e^{\frac{-j2\pi k n}{L}}, \quad \text{(Equation 4)}$$

where $X_m[k]$ and $H_s[k]$ are the Discrete Time Fourier Transforms (DFT) of length L of the signal $x_m[n]$ and of the impulse response of the filter $h_s[n]$, respectively. Since DFTs can be computed efficiently using the Fast Fourier Transform (FFT) algorithm, implementing equation 4 to calculate the output of a filtering operation for very long signals is an efficient solution. Note: each output $y_m[n]$ has a time overlap with the output of the adjacent block, $y_{m+1}[n]$, of K samples. Hence, the larger the time block is, the smaller the overlap is in proportion to the output block length. This fact is shown in chart 180 of FIG. 6, which shows an illustrative OLA process.

Given that distributed sensing involves very large signal blocks, the energy at output block m can be approximated as the energy of the filtering operation for input block m as:

$$d[m] \approx \Sigma_{n=m}^{m+L-1} y_m^2[n]. \quad \text{Equation (5)}$$

This approximation is more precise when M>>K. The computation of d[m] can be further simplified by computing the energy directly in the frequency domain.

Mathematically, the energy for different frequency bands is given as:

$$d_s[m]=\Sigma_{k=0}^{L-1}(X_m[k]H_s[k])^*(X_m[k]H_s[k])=$$
$$\Sigma_{k=0}^{L-1}(X_m^*[k]X_m[k])(H_s^*[k]H_s[k]), \quad \text{Equation (6)}$$

where $d_s[m]$ is the energy for block m and frequency band s, and * denotes the complex conjugate. Hence, an inverse DFT is avoided when computing the power directly for each frequency band.

By defining the L×1 vectors as:

$$X_m X_m^*[0]X_m[0],X_m^*[1]X_m[1], \ldots ,X_m L-1]X_m[L-1]]$$

$$H_s H_s^*[0]H_s[0],H_s^*[1]H_s^*[1], \ldots ,H_s L-1]H_s[L-1]]$$

so that $X_m$ becomes a vector of magnitude-squared frequency coefficients for the data block and $H_s$ becomes a vector of magnitude-squared frequency coefficients for the filter, it is possible to rewrite $d_s[m]$ as the inner product of the two vectors:

$$d_s[m]=X_m^T H_s. \quad \text{Equation (7)}$$

Figure 7:
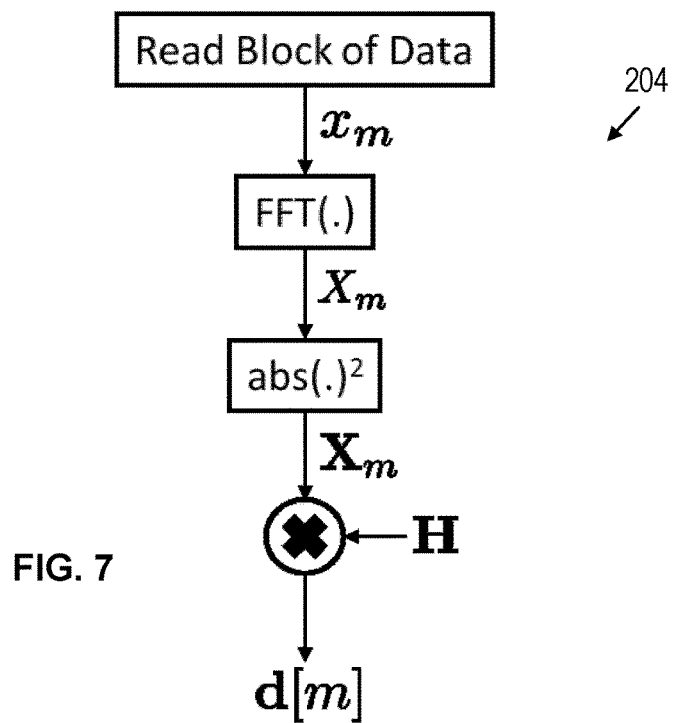
FIG. 7 is a flowchart showing operations for computing energy for different frequency bands.

With the vector d [m]=[$d_1[m],d_2[m], \ldots, d_S[m]$] denoting the energy at frequency bands 1 . . . S, it is possible to stack all S equations into a simple matrix form:

$$d[m]=X_m^T H, \quad \text{Equation (8)}$$

where H is a L×S matrix of magnitude-squared frequency coefficients for the subband filters, defined as H=[$H_1$, $H_2, \ldots, H_S$] (i.e., H contains the stacked frequency response of each frequency band filter). The energy spectrum analysis process corresponding to equations 6-8 is represented in chart 204 of FIG. 7, where the multiplier represents matrix multiplication of the vector of magnitude-squared frequency coefficients of the data block with the matrix of magnitude-squared frequency coefficients of the subband filters, which yields the vector of subband energies. Some alternative embodiments may replace this matrix multiplication with selective sums of those magnitude-squared frequency coefficients corresponding to the different subbands.

The matrix multiplication of equation 8 can be easily implemented in GPUs. Further, the matrix H does not depend on the input signal and can be pre-computed and stored in memory. As needed, updates to the matrix H are also possible via a user interface or programmed update process. Further, since the same signal vector is employed for all computations, only a single DFT of the input signal needs to be computed.

In accordance with at least some embodiments, the filter design used for the disclosed energy spectrum analysis corresponds to a Fast Filter Bank (FFB) with different frequency band filters that are highly selective and complimentary (i.e., the original signal can be reconstructed by simply summing the output signals of each frequency band signal). Such a design facilitates combining frequency band filters as needed to cover different frequency regions. For example, while the total number of frequency bands S for the FFB design is a power of 2, the filters can then be combined to generate any number of frequency band filters.

Figure 8A:
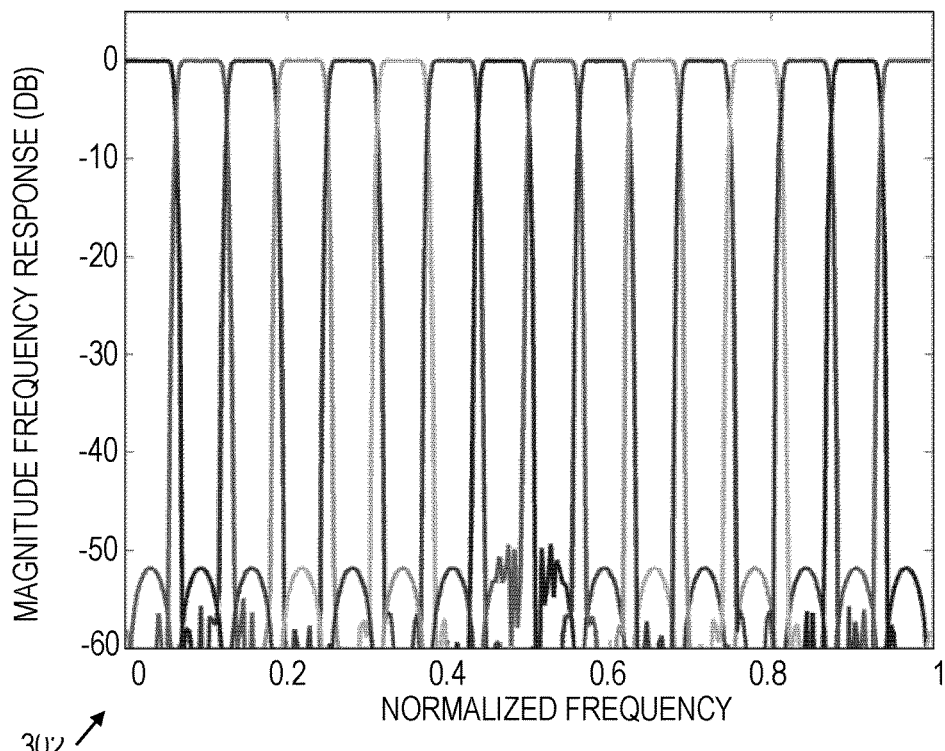
FIGS. 8A and 8B are graphs showing complementary filter magnitude frequency responses.

As an example, graph 302 of FIG. 8A shows the magnitude frequency response of filters for a 16 sub-band decomposition of an input signal. As shown, each filter has a sharp transition band and that there is little overlap between adjacent sub-bands. Further, each filter provides an attenuation of 50 dB in the stop-band and a pass-band with a ripple that is smaller than 0.5 dB.

Figure 8B:
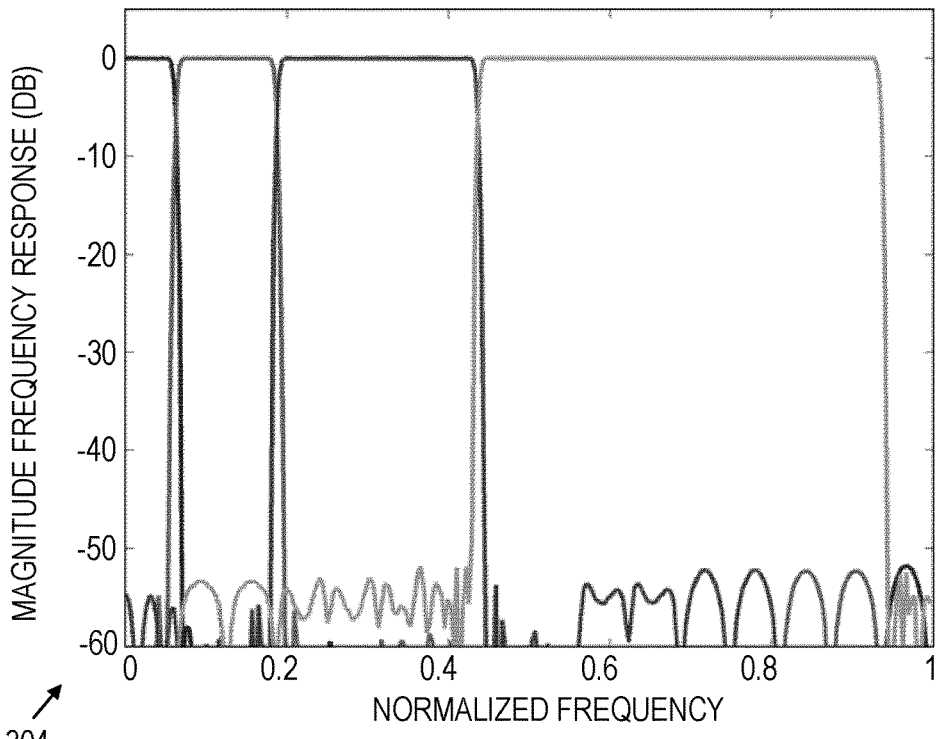

As previously mentioned, the filters of a complimentary filter bank design can be grouped. Graph 304 of FIG. 8B shows one example of how the sub-band filters represented in graph 302 can be combined (a wavelet-like sub-band division is represented in graph 304). Other combinations are possible as well, and adjustments may be pre-programmed or initiated via a user interface.

It should be noted that the quantity H can be pre-computed and stored in memory, and it only needs to be updated if the sub-band filters are modified. Also, since the input signal and the filter coefficients are usually real-valued, the number of data to be stored and multiplied is halved, since its Fourier transform is symmetric around DC. If this is taken into account, then H and have dimensions of L−1/2×S and L−1/2×1, respectively. In practice, this simplification reduces the number of operations that need to be performed by half.

Further, it should be noted that the block length M should be chosen carefully in order for the approximation made to obtain d[m] to hold. Usually, choosing a block length that is at least 10 times larger than the length of the filters should be enough. As an example, if each of the filter impulse responses represented in graph 302 have a length of approximately 500 samples, the block length M should be at least 5000 samples (0.5 sat a sampling frequency of 10 kHz).

Figure 9:
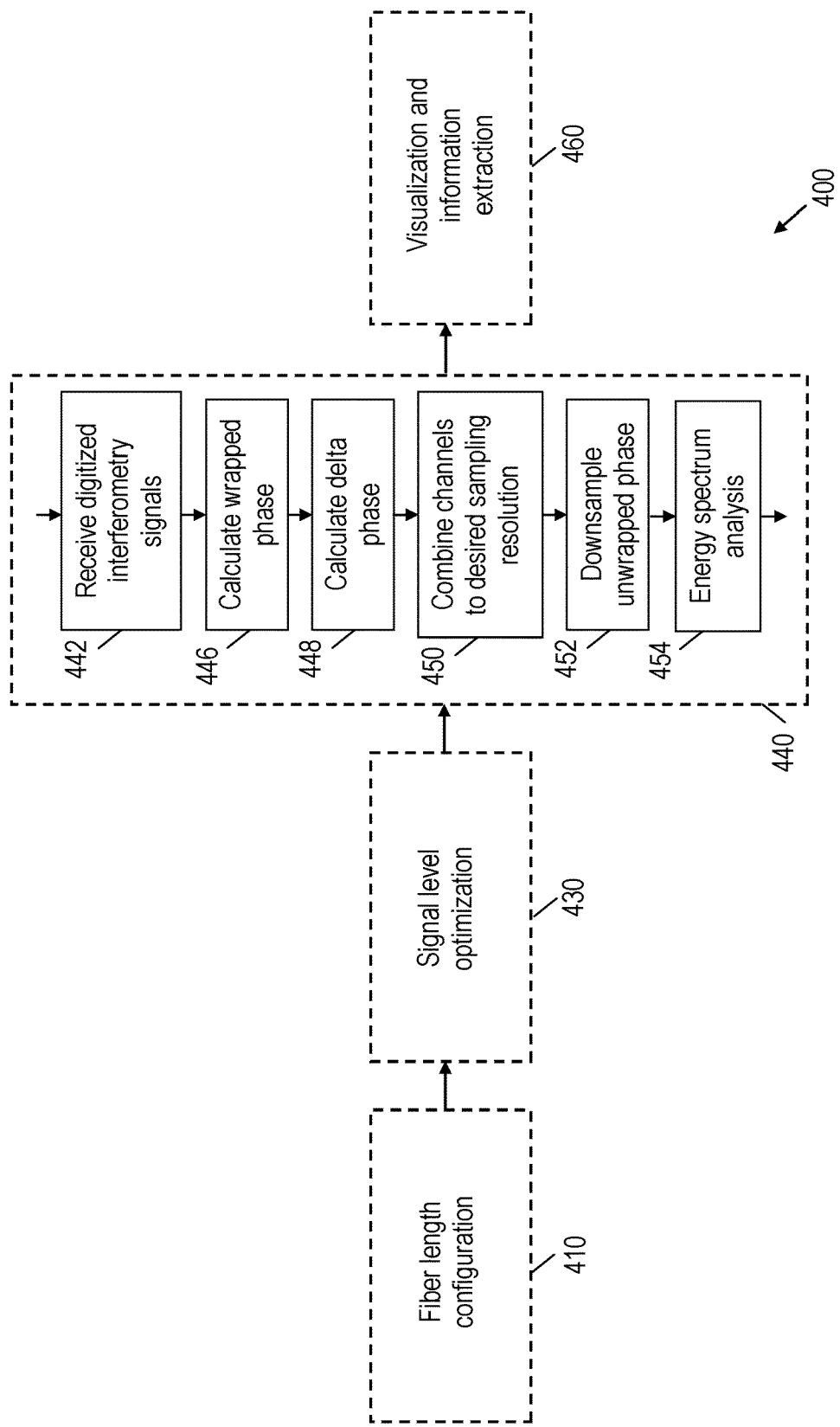
FIG. 9 is a flowchart of an illustrative distributed sensing process.

FIG. 9 shows an illustrative distributed sensing process 400. The process 400 is divided into different stages, including a fiber length configuration stage 410, a signal level optimization stage 430, a data acquisition and processing stage 440, visualization and information extraction stage 460. In the fiber length configuration stage 410, a suitable fiber length is determined, for example, by averaging a number of traces and calculating when a standard deviation (STD) exceeds a threshold. In at least some embodiments, a data acquisition (DAQ) card is configured to collect a number of channels based on the fiber length and a sample rate is set. For example, a suitable sample rate may be around 100,000 samples per kilometer of fiber.

In the signal level optimization stage 430, a suitable signal amplitude is determined, for example, by adjusting a launch erbium-doped fiber amplifier (EDFA) until signal amplitude criteria or thresholds are reached. In at least some embodiments, a digitizer input range and interrogator electronic gain are set to optimize the digitizer range with the signal amplitude.

In the data acquisition and processing stage 440, digitized interferometry signals (e.g., digitized versions of A, B, C, or X, Y, Z) are received at block 442. At block 444, a wrapped phase is calculated. For example, in at least some embodiments, the wrapped phase is determined by performing quadrature demodulation of phase using the digitized interferometry signals. At block 448, a delta phase is calculated by comparing the current phase value with a previous phase value, and phase unwrapping is performed. At block 450, channels are combined to a desired sampling resolution. For example, a weighting factor (e.g., the squared amplitude) can be applied for each channel at block 450. At block 452, the unwrapped phase is optionally downsampled to a desired sample rate. For example, a low pass filter and decimation may be applied at block 452 to downsample the unwrapped phase. At block 454, energy spectrum analysis operations are performed as described herein. In at least some embodiments, the process of flowchart 204 (FIG. 7) and/or equations 6-8 are performed at block 454.

In the visualization and information extraction stage 460, phase values, distributed sensing values, and/or energy spectrum analysis values are displayed. For example, one or more waterfall charts (charts that displays data that moves or slides over time) may be plotted using variance of phase over a short time period (e.g., 50 milliseconds). In at least some embodiments, different waterfall charts corresponding to different frequency bands are generated and displayed. Further, distributed sensing parameters and/or derived data recovered from the distributed sensing process 400 may be used analyze downhole properties or events. As a specific example, acoustic data recovered from the distributed sensing process 400 may be used to monitor seismic fracturing, fluid flow, stimulation or treatment operations, production, etc.

FIGS. 10A-10D show various graphs 500A-500D representing acoustic data obtained from a distributed sensing process, where energy spectrum analysis has been performed as described herein. In graphs 500A-500D, acoustic data intensity is represented by grayscale shade (darker=more intense) as a function of time and position. More specifically, graph 500A represents acoustic data intensity for all frequencies, while graphs 500B and 500C represent acoustic data intensity for particular frequency bands. For example, graph 500B may correspond to a frequency band from 0-313 Hz and graph 500C may correspond to correspond to a 313-625 Hz band. When available, acoustic data for all frequencies and/or for particular frequency bands can be monitored to detect low rate gas flow through perforations, gas flow up a wellbore, liquid dominant multiphase flow through a restriction, gas injection, sand injection, the amount of profit due to fracturing, seismic activity, and/or other events correlated with an acoustic pattern or signature. For graphs 500A-500C, the data represented moves from right-to-left over time. Further, other types of charts or data analysis could be performed once phase information is recovered using distributed sensing process 400 or other interferometry-based sensing.

Figure 10A:
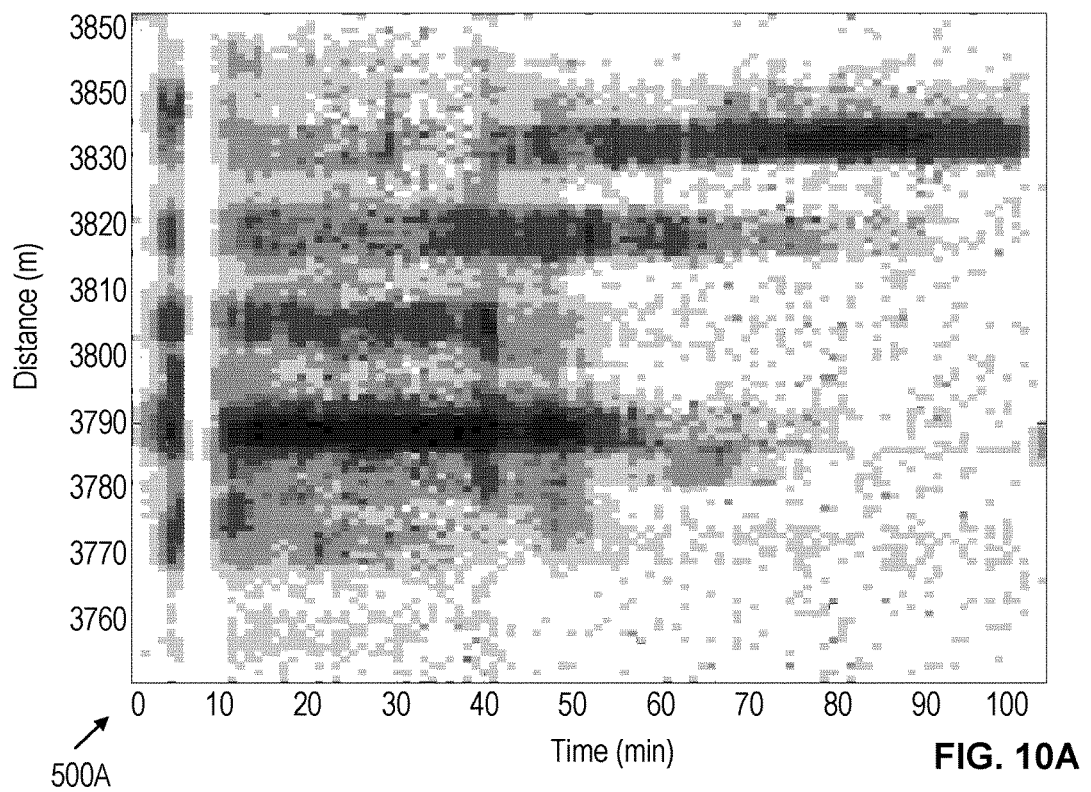
FIGS. 10A-10D are graphs showing a representation of acoustic data obtained from a distributed sensing process.
Figure 10B:
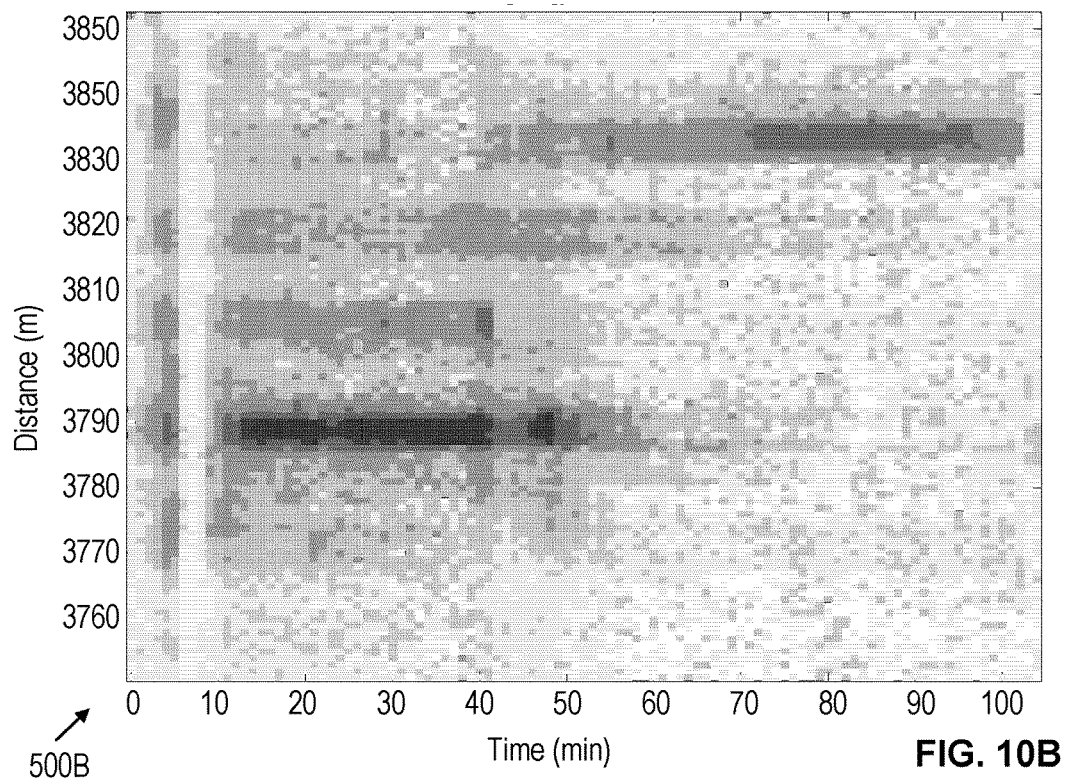
Figure 10C:
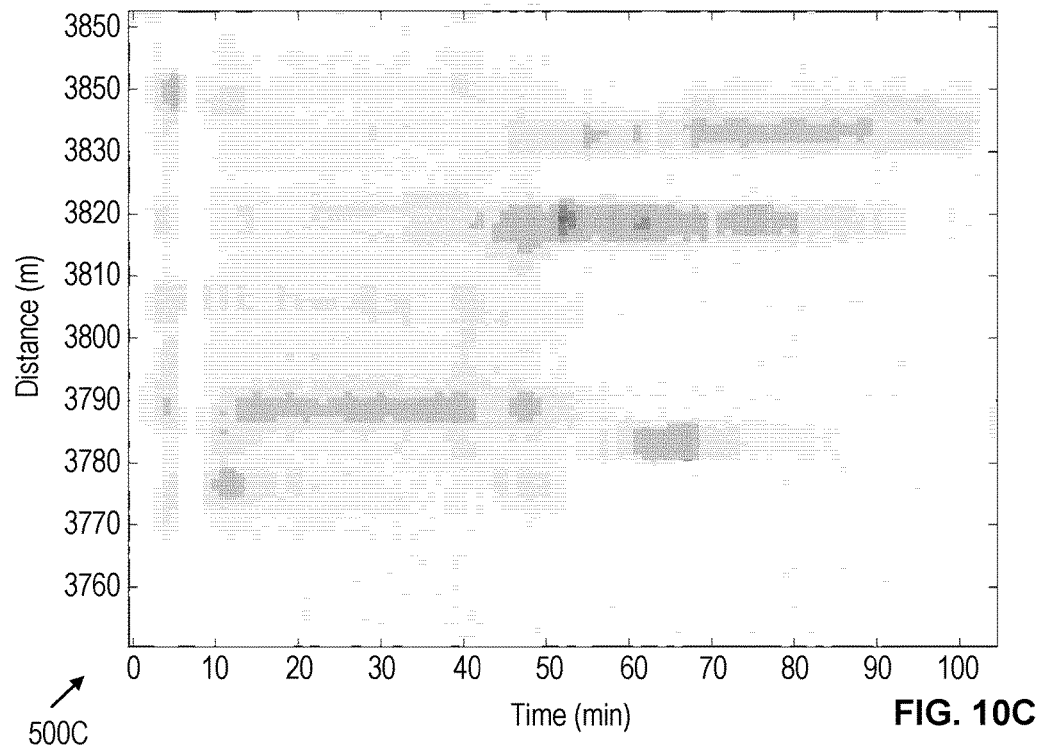
Figure 10D:
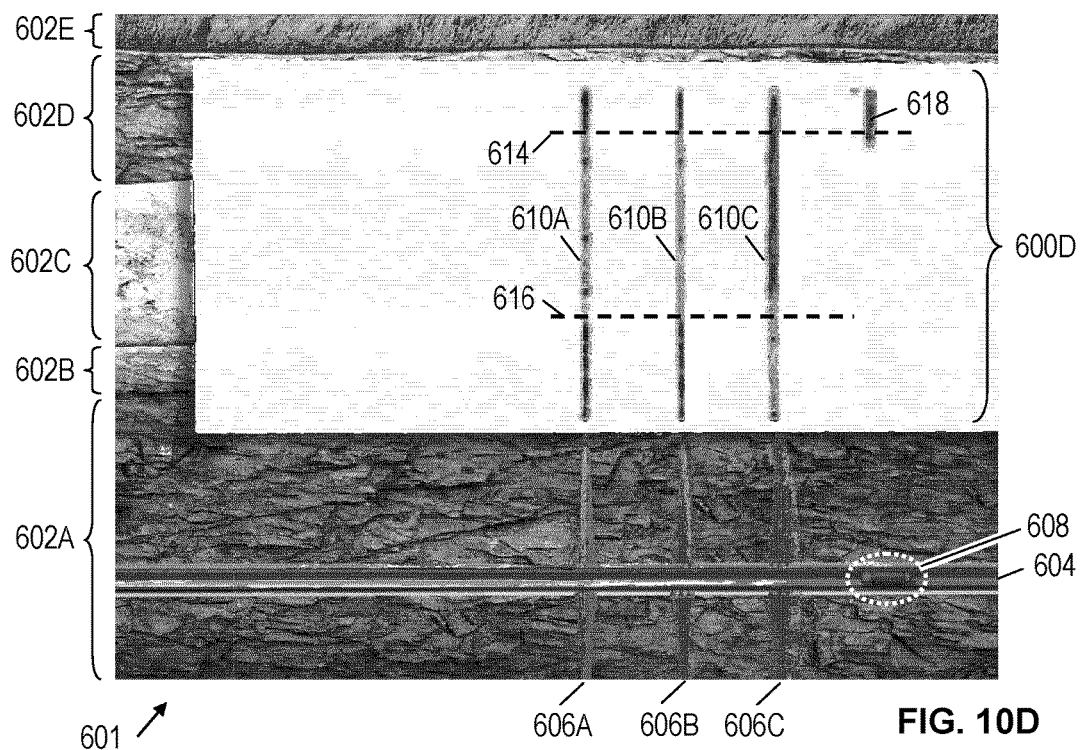

In downhole scenario 601 of FIG. 10D, various formation layers 602A-602E, a well 604, perforations 606A-606C, and a plug 608 are represented. Further, graph 600D represents acoustic data related to downhole scenario 601, where the oldest acoustic activity is at the top and progresses downward over time. As an example, the acoustic data of graph 600D may represent an injection operation that initially results in acoustic activity 618 at or near plug 608 (e.g., a leak), acoustic activity 610A at or near perforation 606A, acoustic activity 610B at or near perforation 606B, and acoustic activity 610C at or near perforation 606C. In an alternative scenario, acoustic activity may occur at or near the location of sliding sleeves along the well 608. The acoustic activity 618 and 610A-610C may correspond to "whistling" or other detectable acoustic content. At time 614, the injection operations introduce a proppant that causes the acoustic activity 618 at or near plug 608 to end (e.g., the leak is plugged or no longer produces acoustic content), and causes the acoustic activity 610A and 610B to decrease over time. Meanwhile, the acoustic activity 610C at or near perforation 606C is not significantly affected by the introduction of a proppant. At time 616, the injection operations introduce diverters that cause the acoustic activity 610A-610C to change. More specifically, the acoustic activity 610C decreases while the acoustic activity 610A and 610B increases due to the introduction of diverters. In general, acoustic data such as charts 600A-600D may be used to monitor downhole operations, to monitor the progress and effect of introducing proppants or other treatments, and/or to make decisions based on such monitoring.

Figure 11:
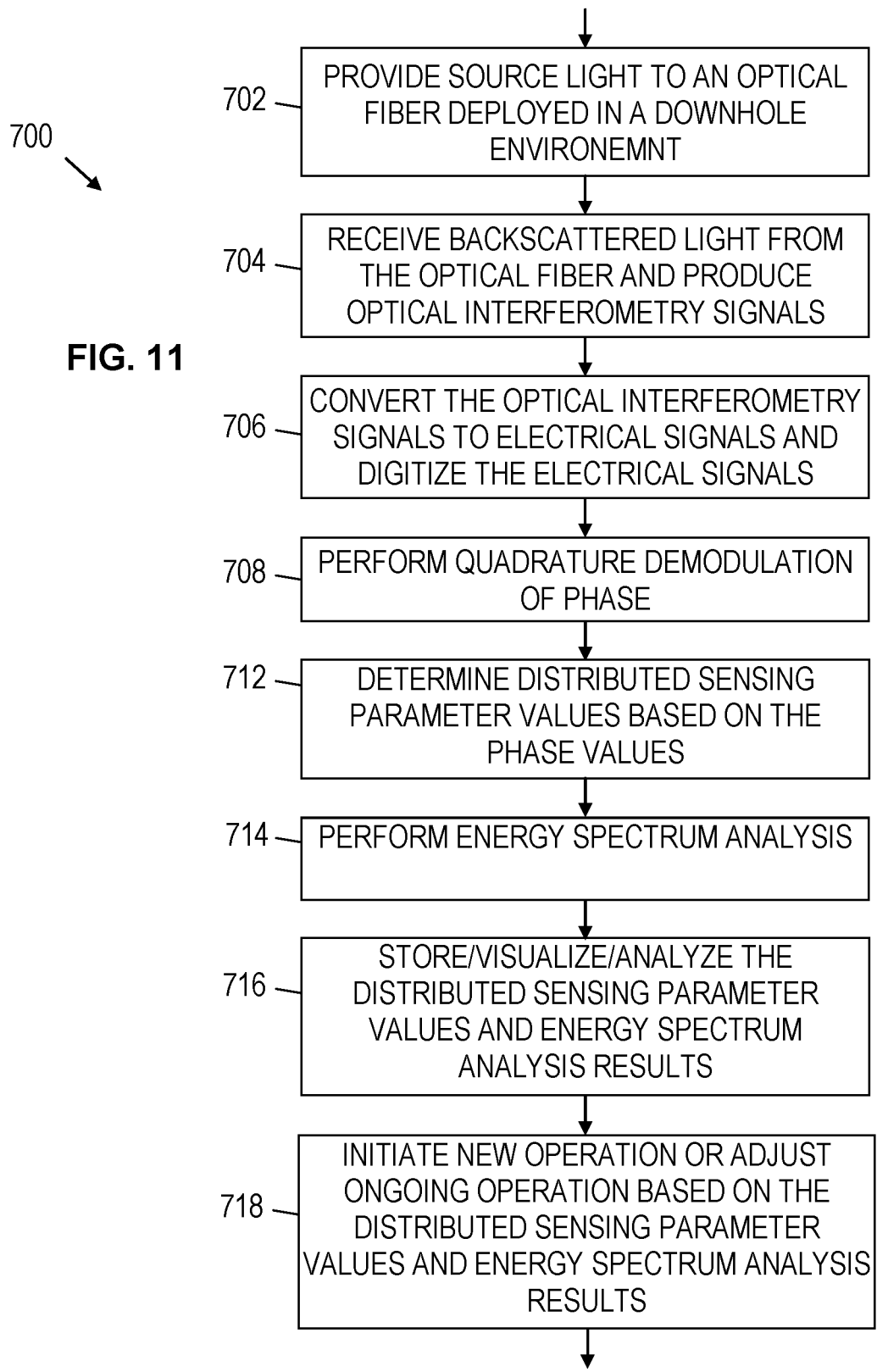
FIG. 11 is a flowchart of a distributed sensing method.

FIG. 11 shows an illustrative distributed sensing method 700. In method 700, source light is provided to an optical fiber deployed in a downhole environment at block 702. At block 704, backscattered light is received from the optical fiber and optical interferometry signals are produced (e.g., A, B, C, or X, Y, Z). At block 706, the optical interferometry signals are converted to electrical signals and the electrical signals are digitized. At block 708, quadrature demodulation of phase is performed using the digitized electrical signals. At block 712, distributed sensing parameters are determined based on the phase values obtained at block 708. At block 714, energy spectrum analysis is performed. For example, the process of flowchart 204 (FIG. 7) and/or equations 6-8 may be performed at block 714, where the input signal for energy spectrum analysis corresponds to a phase signal as a function of time. At block 716, the distributed sensing parameter values and energy spectrum analysis results are stored, visualized, and/or analyzed. At block 718, a new operation is initiated or an ongoing operation is adjusted based on the distributed sensing parameter values and energy spectrum analysis results. For example, the distributed sensing parameter values and/or energy spectrum analysis results determined at blocks 712 and 714 may be used for real-time fluid flow monitoring using acoustic signatures, flow-regime determination, wellbore integrity monitoring, event detection, seismic fracture monitoring, stimulation or treatment operations, production, etc.

Embodiments disclosed herein include:

A: A system that comprises an optical fiber, an interrogator to provide source light to the optical fiber, and a receiver coupled to the optical fiber. The receiver comprises at least one fiber optic coupler that receives backscattered light and that produces one or more optical interferometry signals from the backscattered light, and photo-detectors that produce an electrical signal for each of the one or more optical interferometry signals. The system also comprises at least one digitizer that digitizes each electrical signal, and at least one processing unit that processes each digitized electrical signal to obtain a distributed sensing signal and related energy spectrum information. The energy spectrum information corresponds to energy calculated for each of a limited number of frequency subbands by segmenting the distributed sensing signal into blocks having a predetermined block length and by applying a filter having a filter length that is smaller than the predetermined block length.

B: A method that comprises providing source light to an optical fiber deployed in a downhole environment. The method also comprises receiving backscattered light from the optical fiber and producing one or more optical interferometry signals from the backscattered light. The method also comprises converting each of the one or more optical interferometry signals to an electrical signal and digitizing each electrical signal. The method also comprises determining a distributed sensing signal from each digitized electrical signal. The method also comprises obtaining energy spectrum information corresponding to energy calculated for each of a limited number of frequency subbands of the distributed sensing signal by segmenting the distributed sensing signal into blocks having a predetermined block length and by applying a filter having a filter length that is smaller than the predetermined block length.

Each of embodiments A and B may have one or more of the following additional elements in any combination: Element 1: the filter has a frequency response corresponding to a plurality of different bandpass regions. Element 2: the filter corresponds to a filter matrix that stacks a plurality of different frequency responses. Element 3: the filter has an adjustable frequency response. Element 4: the adjustable frequency response is based on a filter bank design. Element 5: the at least one processing unit obtains the energy spectrum information by performing a Fast Fourier Transform (FFT) for each block, squaring a magnitude for each FFT coefficient, and for each frequency band, combining those squared magnitude FFT coefficients corresponding to that frequency band. Element 6: the predetermined block length is at least ten times greater than the filter length. Element 7: the distributed sensing signal corresponds to a phase signal as a function of time. Element 8: the distributed sensing signal represents acoustic data at different points along the optical fiber. Element 9: the optical fiber is deployed downhole via at least one of drill pipe, coiled tubing, slick line or electric line, or is spooled off of a component that is dropped or pumped downhole. Element 10: further comprising a monitor in communication with the at least one processing unit to display the distributed sensing signal, the energy spectrum information, or data derived from the distributed sensing signal and the energy spectrum information. Element 11: further comprising a tool that initiates or adjusts a downhole operation based on the distributed sensing signal, the energy spectrum information, or data derived from the distributed sensing signal and the energy spectrum information.

Element 12: further comprising selecting a frequency response for the filter corresponding to a plurality of different bandpass regions. Element 13: further comprising adjusting the frequency response of the filter. Element 14: obtaining the energy spectrum information further comprises performing a Fast Fourier Transform (FFT) for each block, squaring an absolute value for each FFT, and multiplying the squared absolute value by the filter. Element 15: the predetermined block length is at least ten times greater than the filter length. Element 16: the distributed sensing signal corresponds to a phase signal as a function of time. Element 17: further comprising deploying the optical fiber downhole via at least one of drill pipe, coiled tubing, slick line or electric line, or spooling the optical fiber off of a component that is dropped or pumped downhole. Element 18: further comprising initiating or adjusting a downhole operation based on the distributed sensing signal, the energy spectrum information, or data derived from the distributed sensing signal and energy spectrum information. Element 19: further comprising displaying the distributed sensing signal, the energy spectrum information, or data derived from the distributed sensing signal and energy spectrum information.

Numerous variations and modifications will become apparent to those skilled in the art once the above disclosure is fully appreciated. For example, the disclosed energy spectrum analysis techniques could also be applied to any sensor-based system (downhole or at earth's surface), where phase modulation and demodulation is performed to recover information. It is intended that the following claims be interpreted to embrace all such variations and modifications.

What is claimed is:

1. A system, comprising:
an optical fiber positioned in a downhole environment;
an interrogator to provide source light to the optical fiber; and
a receiver coupled to the optical fiber, wherein the receiver comprises:
at least one fiber optic coupler that receives backscattered light and that produces one or more optical interferometry signals from the backscattered light;
photo-detectors that produce an electrical signal for each of the one or more optical interferometry signals;
at least one digitizer that digitizes each electrical signal;
at least one processing unit that processes each digitized electrical signal to obtain a distributed sensing signal and related energy spectrum information, wherein the distributed sensing signal is an unwrapped phase of the digitized electrical signal;
wherein the energy spectrum information corresponds to energy calculated for each of a limited number of frequency subbands of the unwrapped phase as a function of position along a length of the optical fiber, the energy calculated by segmenting the unwrapped phase into blocks having a predetermined block length and by applying a filter having a filter length that is smaller than the predetermined block length.

2. The system of claim 1, wherein the filter applied to each block has a frequency response corresponding to a plurality of different bandpass regions.

3. The system of claim 2, wherein the filter corresponds to a vector comprising entries that correspond to a plurality of different frequency responses, each associated with a given subband.

4. The system of claim 1, wherein the filter applied to each block has an adjustable frequency response.

5. The system of claim 4, wherein the adjustable frequency response is based on a filter bank design.

6. The system of claim 1, wherein the at least one processing unit obtains the energy spectrum information by performing a Fast Fourier Transform (FFT) for each block, squaring a magnitude for each FFT coefficient, and multiplying the squared magnitude by the filter.

7. The system of claim 6, wherein the energy is calculated without performing an inverse FFT operation.

8. The system of claim 6, wherein the filter is a vector of magnitude squared frequency coefficients.

9. The system of claim 1, wherein the predetermined block length is at least ten times greater than the filter length.

10. The system of claim 1, wherein the distributed sensing signal corresponds to a phase signal as a function of time.

11. The system of claim 1, wherein the distributed sensing signal represents acoustic data at different points along the optical fiber.

12. The system of claim 1, wherein the optical fiber is deployed downhole via at least one of drill pipe, coiled tubing, slick line or electric line, or is spooled off of a component that is dropped or pumped downhole.

13. The system of claim 1, further comprising a monitor in communication with the at least one processing unit to display the distributed sensing signal, the energy spectrum information, or data derived from the distributed sensing signal and the energy spectrum information.

14. The system of claim 1, further comprising a tool that initiates or adjusts a downhole operation based on the distributed sensing signal, the energy spectrum information, or data derived from the distributed sensing signal and the energy spectrum information.

15. A method, comprising:
providing source light to an optical fiber deployed in a downhole environment;
receiving backscattered light from the optical fiber and producing one or more optical interferometry signals from the backscattered light;
converting each of the one or more optical interferometry signals to an electrical signal and digitizing each electrical signal;
determining a distributed sensing signal from each digitized electrical signal, wherein the distributed sensing signal is an unwrapped phase of the digitized electrical signal; and
obtaining energy spectrum information corresponding to energy calculated for each of a limited number of frequency subbands of the unwrapped phase as a function of position along a length of the optical fiber, the energy calculated by segmenting the unwrapped phase into blocks having a predetermined block length and by applying to each block a filter having a filter length that is smaller than the predetermined block length.

16. The method of claim 15, further comprising selecting a frequency response for the filter corresponding to a plurality of different bandpass regions.

17. The method of claim 16, further comprising adjusting the frequency response of the filter.

18. The method of claim 15, wherein obtaining the energy spectrum information further comprises performing a Fast Fourier Transform (FFT) for each block, squaring an absolute value for each FFT, and multiplying the squared absolute value by the filter.

19. The method of claim 18, wherein the energy is calculated without performing an inverse FFT operation.

20. The method of claim 18, wherein the filter is a vector of magnitude squared frequency coefficients.

21. The method of claim 15, wherein the predetermined block length is at least ten times greater than the filter length.

22. The method of claim 15, wherein the distributed sensing signal corresponds to a phase signal as a function of time.

23. The method of claim 15, further comprising deploying the optical fiber downhole via at least one of drill pipe, coiled tubing, slick line or electric line, or spooling the optical fiber off of a component that is dropped or pumped downhole.

24. The method of claim 15, further comprising initiating or adjusting a downhole operation based on the distributed sensing signal, the energy spectrum information, or data derived from the distributed sensing signal and energy spectrum information.

25. The method of claim 15, further comprising displaying the distributed sensing signal, the energy spectrum information, or data derived from the distributed sensing signal and energy spectrum information.

* * * * *